United States Patent
Maruko

(10) Patent No.: US 8,495,270 B2
(45) Date of Patent: Jul. 23, 2013

(54) COMMUNICATION INTERFACE DEVICE AND COMMUNICATION METHOD

(75) Inventor: Tsuguto Maruko, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 218 days.

(21) Appl. No.: 13/159,531

(22) Filed: Jun. 14, 2011

(65) Prior Publication Data

US 2011/0320853 A1 Dec. 29, 2011

(30) Foreign Application Priority Data

Jun. 28, 2010 (JP) ................................. 2010-146918

(51) Int. Cl.
*G06F 13/00* (2006.01)
*G06F 13/40* (2006.01)

(52) U.S. Cl.
USPC ............ 710/307; 710/100; 710/305; 710/306

(58) Field of Classification Search
USPC ......................................... 710/305, 306, 307
See application file for complete search history.

(56) References Cited

U.S. PATENT DOCUMENTS

| | | | | |
|---|---|---|---|---|
| 5,878,234 A | * | 3/1999 | Dutkiewicz et al. | 710/110 |
| 2002/0108011 A1 | * | 8/2002 | Tanha | 710/306 |
| 2008/0294817 A1 | * | 11/2008 | Tsuneki | 710/100 |

FOREIGN PATENT DOCUMENTS

| JP | 63-250759 | | 10/1988 |
|---|---|---|---|
| JP | 2002-232508 | | 8/2002 |
| JP | 2008257506 A | * | 10/2008 |

* cited by examiner

Primary Examiner — Mark Connolly
(74) Attorney, Agent, or Firm — Volentine & Whitt, PLLC

(57) ABSTRACT

A communication interface device includes: a first interface circuit including a chip select terminal connected to a first terminal, a clock terminal connected to a second terminal, and a data terminal connected to a third terminal; and a second interface circuit including a second clock terminal connected to the first terminal and a data terminal connected to the third terminal. In a case of performing communication by the first interface circuit, a fixed signal fixed at a predetermined level is input into the first terminal, a clock signal is input into the second terminal, and a data signal is input into the third terminal, and in a case of performing communication by the second interface circuit, the clock signal is input into the first terminal and the data signal is input into the third terminal.

10 Claims, 8 Drawing Sheets

PROIR ART

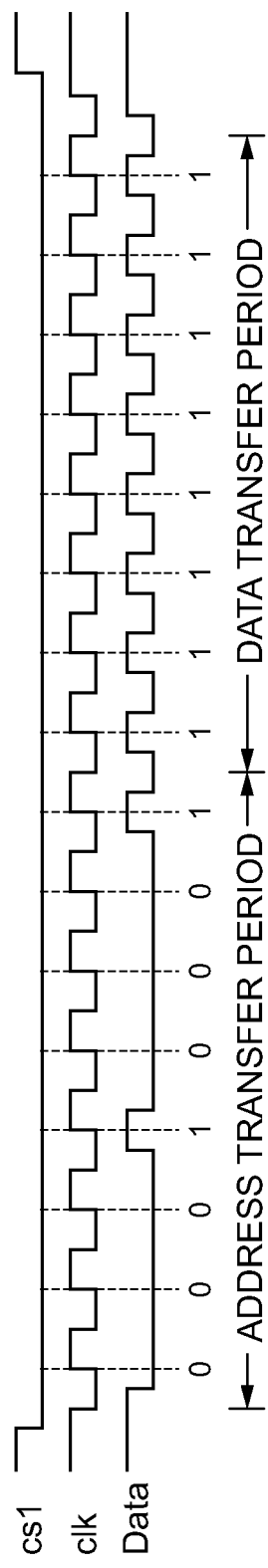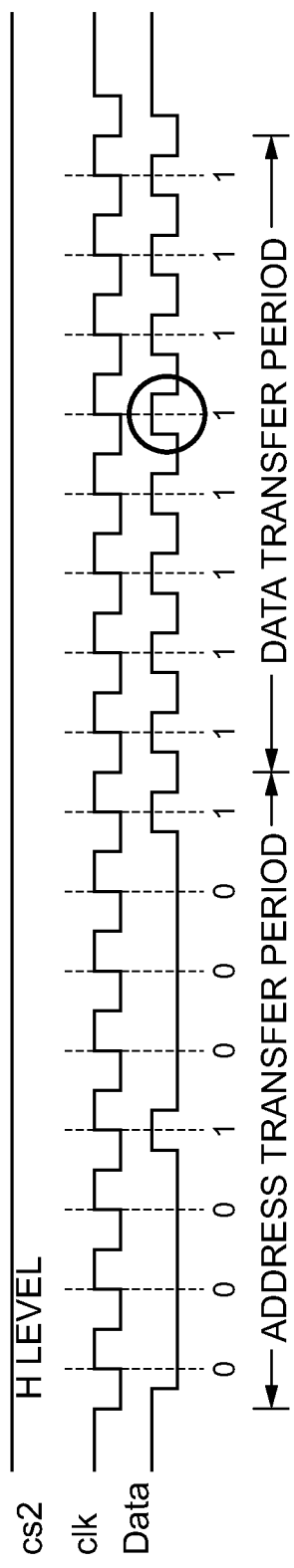
PRIOR ART

COMMUNICATION INTERFACE DEVICE AND COMMUNICATION METHOD

CROSS-REFERENCE TO RELATED APPLICATION

This application claims priority under 35 USC 119 from Japanese Patent Application No. 2010-146918 filed on Jun. 28, 2010, the disclosure of which is incorporated by reference herein.

BACKGROUND OF THE INVENTION

1. Field of the Invention

The invention relates to a communication interface device and a communication method, and particularly to a communication interface device and a communication method capable of communication via plural different interface protocols.

2. Related Art

Conventionally, there has been widely used various serial bus interfaces such as Serial Peripheral Interface (SPI) and Inter-Integrated Circuit (I2C) in communication between CPU and peripheral devices or communication among chips. The SPI is known as one of three-wire serial bus interfaces and the I2C is known as one of two-wire serial bus interfaces, and both are widely used. Thus, in recent years, the interface circuits for both the two-wire system and the three-wire system are mounted on many integrated circuits so as to adapt to the both.

As a method for recognizing two types of interface protocols, conventionally a terminal for recognizing (selecting) a protocol is provided in addition to a terminal required for serial bus communication, and a selection signal for selecting a protocol is input into the additional terminal from the outside to select and operate either the two-wire circuit or the three-wire circuit.

Alternately, there is proposed a method for automatically recognizing two types of interface protocols. For example, Japanese Patent Application Laid-Open (JP-A) No. 2002-232508 discloses a method for determining a protocol from a chip enable signal by sharing a clock terminal and a data terminal between the two-wire system and the three-wire system. Further, JP-A No. 63-250759 discloses a method for recognizing a protocol by transmitting a special signal for recognizing a protocol (dummy access) before data transfer.

However, the method disclosed in JP-A No. 2002-232508 has a problem leading to an erroneous operation.

This erroneous operation will be described with reference to FIGS. 7 and 8A-B.

FIG. 7 shows an example of a configuration of a communication circuit that performs communication between a CPU 300 and Large Scale Integration Circuits (LSIs) 301, 302 by using the method disclosed in JP-A No. 2002-232508. The LSIs 301 and 302 are respectively configured operable in both the I2C and SPI interface protocols.

A clock line 305 for transmitting a clock signal clk and a data line 306 for transmitting a data signal Data respectively branch into two and are connected to the LSI 301 and the LSI 302. Thus, a configuration is made such that a clock signal clk to be supplied to the LSI 301 and a clock signal clk to be supplied to the LSI 302 are input from a common terminal and a data signal Data to be transferred to the LSI 301 and a data signal Data to be transferred to the LSI 302 are input from a common terminal (which is different from the terminal into which the clock signals clk are input) among the terminals into which signals are input from the CPU 300.

A chip select line 303 transmits a chip selection signal cs1 to the LSI 302. A chip select line 304 transmits a chip selection signal cs2 to the LSI 301.

When the chip selection signal cs1 is at the Low level, SPI communication is performed between the LSI 302 and the CPU 300. The chip selection signal cs2 is set at the High level during the period in which the SPI communication is performed between the LSI 302 and the CPU 300 such that the LSI 301 does not operate (does not perform communication).

When the chip selection signal cs2 is at the Low level, the SPI communication is performed between the LSI 301 and the CPU 300. The chip selection signal cs1 is set at the High level during the period in which the SPI communication is made between the LSI 301 and the CPU 300 such that the LSI 302 does not operate (does not perform communication).

The communication circuit is connected with a register and the like, and data indicated by the data signal output from the LSI which is selected and operated by the chip selection signal cs1 or cs2 among the LSI 301 and the LSI 302 is written into the connected register.

An explanation will be made of a case in which data 0xff is written in an address 0x11 of the register via the LSI 302 through the SPI communication.

FIG. 8A is a time chart of the signals to the LSI 302, and FIG. 8B is a time chart of the signals to the LSI 301. As shown in FIG. 8A, the chip selection signal cs1 is first set at the Low level for operating the LSI 302 in order to transfer the address 0x11, and after the address transfer, data transfer is performed.

In this way, although normal communication appears to be possible in terms of only the LSI 302, since the terminal for inputting the data signal and the terminal for inputting the clock signal are shared between the LSIs, the same signals other than the chip selection signal cs2 are also input into the LSI 301.

Since the chip selection signal cs2 is fixed at the High level, the SPI communication will not be established for the LSI 301. However, from the viewpoint of operation in the I2C interface protocol, when the data signal Data changes to Low while the clock signal clk is at High, the I2C start condition is satisfied.

Further, an LSI-specific slave address is assigned to each of the LSIs in the I2C protocol. Typically, a slave address indicating a communication destination is transmitted after the start condition in the I2C protocol. However, in this example, in a case in which the slave address specific to the LSI 301 is 0x1f, when a signal matching with the slave address 0x1f has been transmitted as the data signal Data after the start condition as shown in FIG. 8B, the LSI 301 may erroneously recognize that an I2C access has been made.

As a result, the LSI 301 tries to transmit a Low-level signal as acknowledgement to the CPU 300 via the data line 306 in a period circled in FIG. 8B. At this time, the CPU 300 tries to transmit data to the LSI 302 in the SPI protocol; however, since the LSI 301 tries to set the data line 306 at the Low level, the data for the LSI 302 may be corrupted in the acknowledgement period. In other words, since the CPU operates in a High drive and the LSI 301 operates in a Low drive in the acknowledgement period, the communication quality remarkably deteriorates, which leads to an erroneous operation.

This problem occurs because the terminal for inputting the data signal to be supplied to the LSI 301 and the terminal for inputting the data signal to be supplied to the LSI 302 are common, and further the terminal for inputting the clock signal to be supplied to the LSI 301 and the terminal for inputting the clock signal to be supplied to the LSI 302 are common.

The method described in JP-A No. 63-250759 has a problem that since a protocol is recognized via a special access (dummy access), when plural Leis are connected to an interface bus (for example, when a LSI requiring dummy access and a LSI not requiring dummy access coexist in the plural Leis), control therefore is complicated.

SUMMARY

The invention takes into account the above, and provides a communication interface device and a communication method capable of being configured such that while a communication is being performed in one of two different interface circuits, a communication is prevented from being performed in the other interface circuit, without performing a complicated control.

An aspect of the invention is a communication interface device including: a first interface circuit including a chip select terminal connected to a first terminal, a clock terminal connected to a second terminal, and a data terminal connected to a third terminal; and a second interface circuit including a second clock terminal connected to the first terminal and a data terminal connected to the third terminal, wherein in a case of performing communication by the first interface circuit, a fixed signal fixed at a predetermined level is input into the first terminal, a clock signal is input into the second terminal, and a data signal is input into the third terminal, and in a case of performing communication by the second interface circuit, the clock signal is input into the first terminal and the data signal is input into the third terminal.

According to the above configuration, while a communication is performed in one interface circuit, a communication cannot be made in the other interface circuit, without performing a complicated control. The fixed signal to be input into the first terminal when a communication is performed in the first interface circuit may be set at a level that does not meet a communication start condition of the second interface circuit.

In the above aspect, the communication interface may further include a selecting unit, wherein in a case of performing communication by the second interface circuit, a fixed signal fixed at a predetermined level is input into the second terminal, and the selecting unit selects signals output from the second interface circuit in a case in which the signal input into the second terminal is the fixed signal, and selects signals output from the first interface circuit in a case in which the signal input into the second terminal is the clock signal.

With this configuration, while a communication is performed in one interface circuit, a signal output from the one interface circuit can be selected without performing a complicated control.

In the above configuration, the selecting unit may include: a selector into which a selection signal for selecting either the signals output from the first interface circuit or the signals output from the second interface circuit is input, the selector selecting the signals output from the first interface circuit in a case in which the input selection signal is at a first level, and selecting the signals output from the second interface circuit in a case in which the input selection signal is at a second level; and a D flip-flop having a third clock terminal connected to the second terminal, and an output terminal that outputs the selection signal at the first level to the selector in a case in which a signal input into the third clock terminal is the clock signal, and outputs the selection signal at the second level to the selector in a case in which the signal input into the third clock terminal is the fixed signal.

Thereby, an appropriate signal can be selected with a simple structure.

The above configuration may further include a noise filter that removes disturbance noise, the noise filter being disposed between the third clock terminal of the D flip-flop and the second terminal.

With this configuration, the D flip-flop can be prevented from erroneous operation due to disturbance noise, and an appropriate selection signal can be input from the D flip-flop into the selector.

The above configuration may further include a detection controlling unit, wherein the D flip-flop is configured such that the selection signal at the second level is input from the output terminal of the D flip-flop into the selector in a reset state thereof, and the detection controlling unit detects a communication status of at least one of the first interface circuit or the second interface circuit, and controls such that while communication is not being detected in the first interface circuit or communication is being detected in the second interface circuit, the D flip-flop is in the reset state.

With this configuration, the selection signal at the second level can be input into the selector while a communication is performed in the second interface circuit despite of a disturbance noise.

In the above aspect, the communication interface device may further include a selecting unit that selects the signals output from the second interface circuit in a case in which a signal input into the first terminal is the clock signal, and selects the signals output from the first interface circuit in a case in which the signal input into the first terminal is the fixed signal.

With this configuration, while a communication is performed in one interface circuit, a signal output from the one interface circuit can be selected without performing a complicated control.

In the above configuration, the selecting unit may include: a selector into which a selection signal for selecting either the signals output from the first interface circuit or the signals output from the second interface circuit is input, the selector selecting the signals output from the first interface circuit in a case in which the input selection signal is at a first level, and selecting the signals output from the second interface circuit in a case in which the input selection signal is at a second level; and a D flip-flop having a third clock terminal connected to the first terminal, and an output terminal that outputs the selection signal at the first level to the selector in a case in which a signal input into the third clock terminal is the fixed signal, and outputs the selection signal at the second level to the selector in a case in which the signal input into the third clock terminal is the clock signal.

Thereby, an appropriate signal can be selected with a simple structure.

The above configuration may further include a noise filter that removes disturbance noise, the noise filter being disposed between the third clock terminal of the D flip-flop and the first terminal.

With this configuration, the D flip-flop can be prevented from erroneous operation due to disturbance noise, and an appropriate selection signal can be input from the D flip-flop into the selector.

The above configuration may further include a detection controlling unit, wherein the D flip-flop is configured such that the selection signal at the first level is input from the output terminal of the D flip-flop into the selector in a reset state thereof, and the detection controlling unit detects a communication status of at least one of the first interface circuit and the second interface circuit, and controls such that while communication is being detected in the first interface circuit or communication is not being detected in the second interface circuit, the D flip-flop is in the reset state.

With this configuration, the selection signal at the first level can be input into the selector while a communication is performed in the first interface circuit despite of a disturbance noise.

Another aspect of the invention is a communication method of a communication interface device including a first interface circuit having a chip select terminal connected to a first terminal, a clock terminal connected to a second terminal, and a data terminal connected to a third terminal, and a second interface circuit having a second clock terminal connected to the first terminal and a data terminal connected to the third terminal, the method including: in a case of performing communication by the first interface circuit, inputting a fixed signal fixed at a predetermined level into the first terminal, inputting a clock signal into the second terminal, and inputting a data signal into the third terminal; and in a case of performing communication by the second interface circuit, inputting the clock signal into the first terminal and inputting the data signal into the third terminal.

According to the second aspect, as same in the first aspect, while a communication is performed in one of the two different interface circuits, a communication cannot be made in the other interface circuit without performing complicated control.

As described above, according to the aspects of the present invention, it is possible to configure without performing a complicated control such that while a communication is performed in one of two different interface circuits, a communication cannot be made in the other interface circuit.

BRIEF DESCRIPTION OF THE DRAWINGS

Exemplary embodiments of the present invention will be described in detail based on the following figures, wherein:

FIG. 8A shows a time chart of signals for one LSI in the conventional art; and

FIG. 8B shows a time chart of signal for the other LSI in the conventional art.

DETAILED DESCRIPTION

First Exemplary Embodiment

Figure 1:
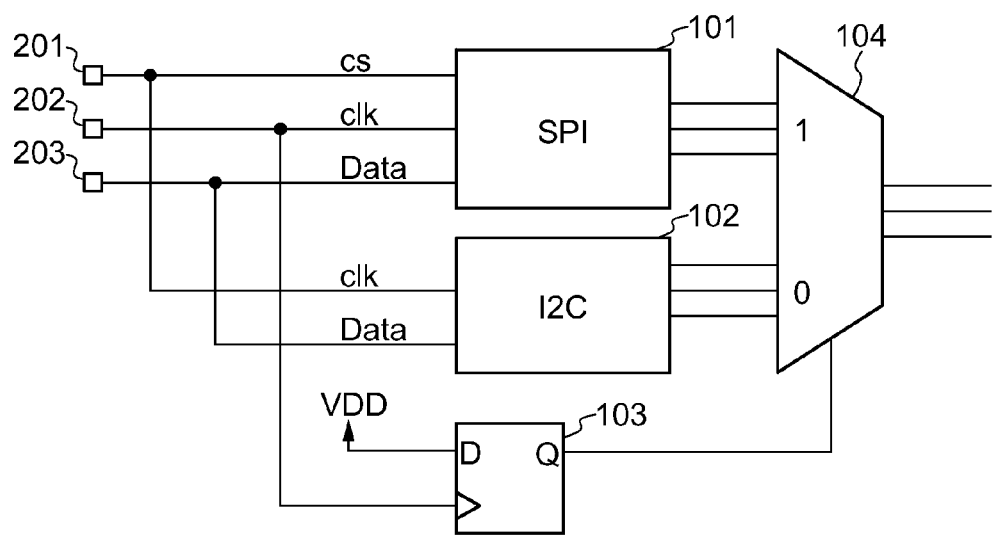
FIG. 1 is a circuit diagram of a communication interface device according to a first exemplary embodiment.

FIG. 1 is a circuit diagram of a communication interface device according to a first exemplary embodiment.

The communication interface device according to the exemplary embodiment includes a SPI interface circuit 101 that performs communication in SPI protocol which is one of three-wire serial bus interface protocols, an I2C interface circuit 102 that performs communication in I2C protocol which is one of two-wire serial bus interface protocols, a D flip-flop circuit (hereinafter referred to as DFF) 103, a selector 104, a first terminal 201, a second terminal 202 and a third terminal 203.

The SPI interface circuit 101 is provided with a chip select terminal into which a chip selection signal cs is input, a clock terminal into which a clock signal clk is input, and a data terminal into which a data signal data is input.

The I2C interface circuit 102 is provided with a clock terminal into which a clock signal clk is input, and a data terminal into which a data signal Data is input.

The first terminal 201 is connected to the chip select terminal of the SPI interface circuit 101 and the clock terminal of the I2C interface circuit 102. The second terminal 202 is connected to the clock terminal of the SPI interface circuit 101 and the clock terminal of the DFF 103. The third terminal 203 is connected to the data terminal of the SPI interface circuit 101 and the data terminal of the I2C interface circuit 102.

The D terminal of the DFF 103 is connected to a power supply that supplies a power supply voltage VDD. The Q terminal of the DFF 103 is connected to the selector 104. The DFF 103 is reset when a High-level signal (reset signal) is input into the clear terminal provided in the DFF 103, and an output from the Q terminal is fixed at the Low level until a clock signal is input into the clock terminal of the DFF 103. Therefore, in the reset state (initial state), the output of the Q terminal which is a non-inverting output terminal of the DFF 103 is fixed at the Low level. The DFF 103 according to the exemplary embodiment is configured without a preset terminal for setting the output of the Q terminal at the High level and setting the DFF 103 in the reset state in response to the input of a preset signal, or configured not to use the preset terminal even if provided.

The output terminals of the SPI interface circuit 101 and the output terminals of the I2C interface circuits 102 are connected to the selector 104, respectively. Signals input into the SPI interface circuit 101 are output from the output terminals of the SPI interface circuit 101 to the selector 104, and signals input into the I2C interface circuit 102 are output from the output terminals of the I2C interface circuit 102 to the selector 104.

The selector 104 exclusively selects the signals output from the output terminals of the SPI interface circuit 101 or the signals output from the output terminals of the I2C interface circuit 102 depending on the signal output from the Q terminal of the DFF 103. In the present exemplary embodiment, when the signal output from the Q terminal of the DFF 103 is at the High level (1), the selector 104 selects the signals output from the output terminals of the SPI interface circuit 101, and when the signal output from the Q terminal of the DFF 103 is at the Low level (0), the selector 104 selects the signals output from the output terminals of the I2C interface circuit 102. The selector 104 outputs (writes), into an address (register address) indicated by the selected data signal, data indicated by the signals selected subsequent to the signal indicating the address.

The present exemplary embodiment is configured such that in a case of communication in the two-wire I2C interface protocol, a signal input into the second terminal 202 is fixed at the GND level, that is, at the Low level. However, embodiments are not limited thereto, and an embodiment may be configured such that in a case of communication in the two-wire I2C interface protocol, a signal input into the second terminal 202 is fixed at the VDD level, i.e., the High level.

Further, in the present exemplary embodiment, a central processing unit (CPU) (not shown) is connected to the first terminal 201, the second terminal 202 and the third terminal 203, and inputs signals into the terminals; however, embodiments are not limited to this and a source of inputs signals may be any other control circuits or the like while it inputs signals to the terminals.

Figure 2:
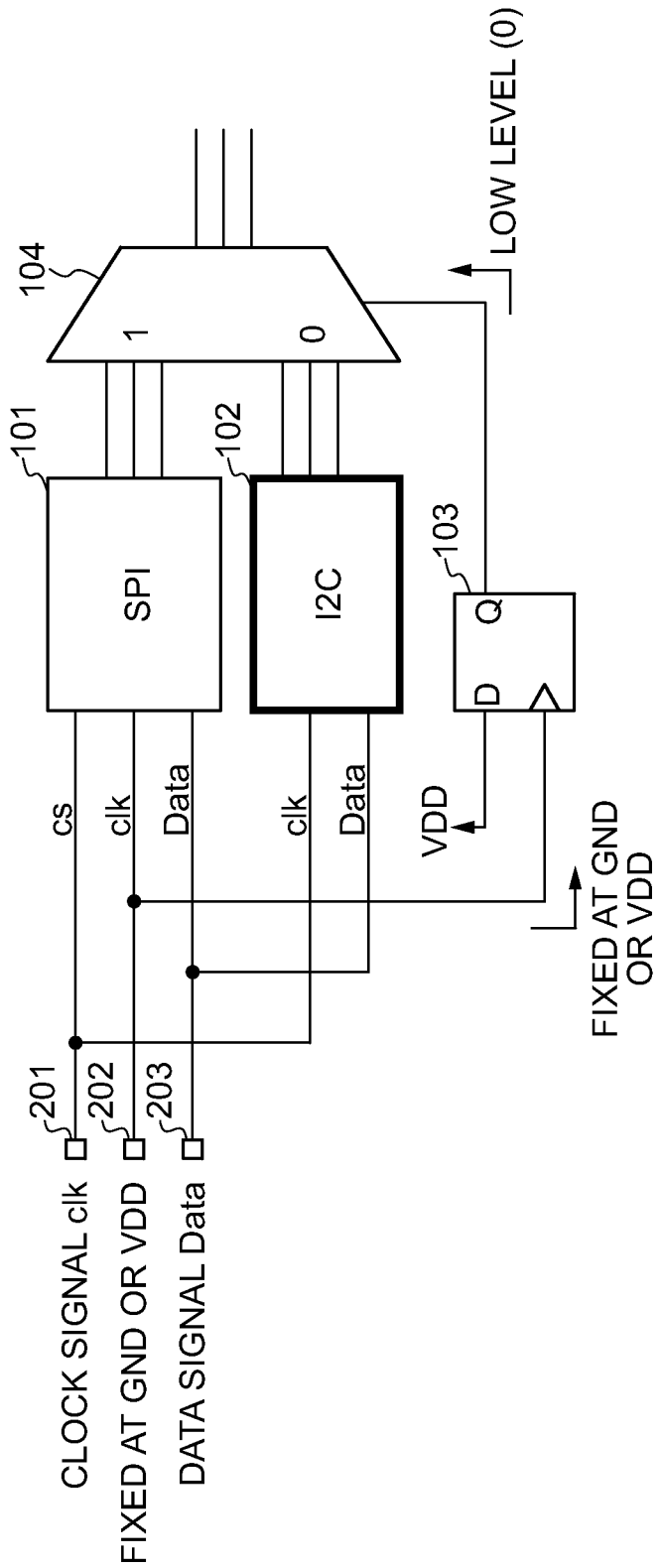
FIG. 2 is an explanatory diagram for explaining a flow of signals during I2C communication.

First, operations in a case in which a communication is performed via the two-wire I2C interface protocol will be described with reference to FIG. 2.

The CPU inputs a reset signal into the clear terminal of the DFF 103 in advance to set the DFF 103 in the reset state, then inputs a clock signal clk into the first terminal 201, and inputs a data signal Data into the third terminal 203. Specifically, the CPU inputs signals for setting I2C start condition into the first terminal 201 and the third terminal 203, and then inputs the clock signal into the first terminal 201 and inputs address information and data to be transferred into the third terminal 203.

In the reset state in which the CPU inputs the reset signal into the clear terminal of the DFF 103 in advance, as long as the clock signal is not input into the clock terminal of the DFF 103, the output of the Q terminal of the DFF 103 is fixed at the Low level. As described above, since the second terminal 202 is fixed at the Low level (or the High level) during the communication via the I2C interface protocol, the DFF 103 does not operate. In other words, the output of the Q terminal of the DFF 103 is kept fixed at the Low level.

Due thereto, the selector 104 selects and outputs (writes) the output signals of the I2C interface circuit 102 to the register.

Figure 3:
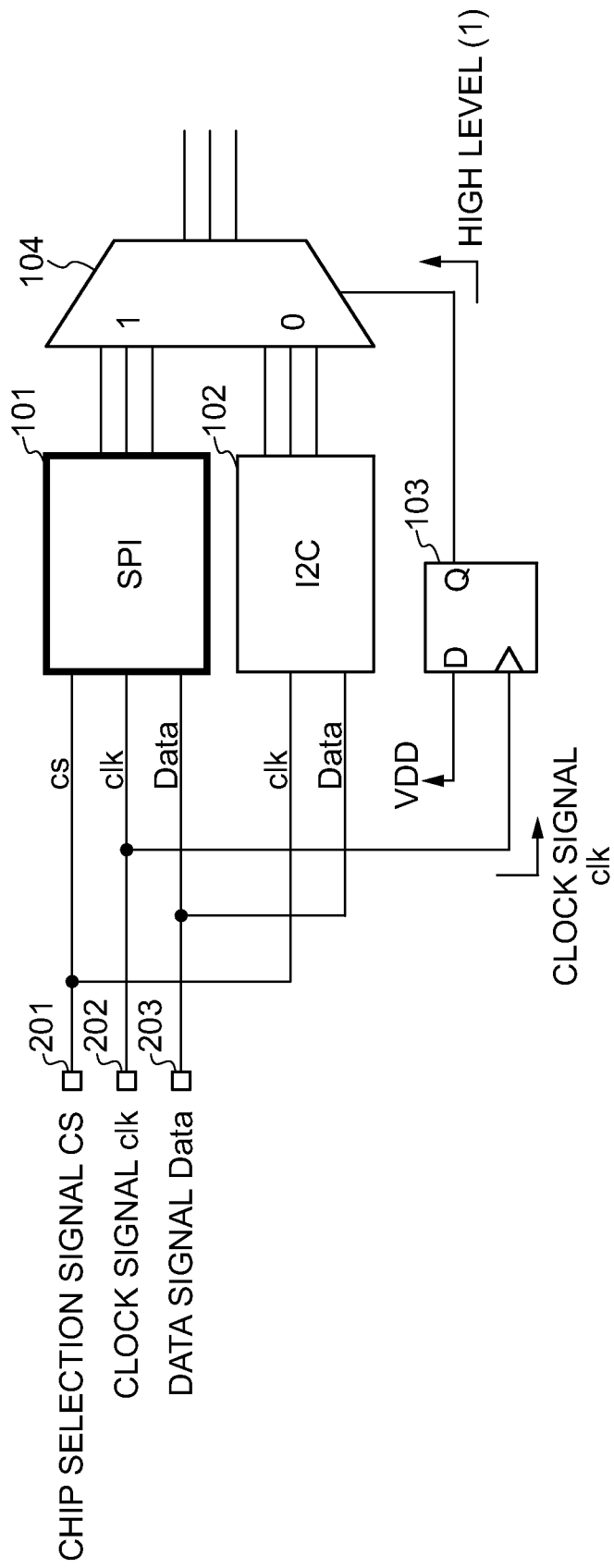
FIG. 3 is an explanatory diagram for explaining a flow of signals during SPI communication.

Next, operations in a case in which a communication is performed via the three-wire SPI interface protocol will be described below with reference to FIG. 3.

The CPU inputs, into the first terminal 201, a chip selection signal that permits the SPI interface circuit 101 to perform the SPI communication operations, and prevents the start condition of the I2C interface circuit 102 from being satisfied. Specifically, the chip selection signal cs fixed at the Low level is input into the first terminal 201. The SPI interface circuit 101 recognizes that a SPI communication is permitted by the chip selection signal cs input from the first terminal 201. Further, the CPU inputs the clock signal clk into the second terminal 202, and inputs and transfers the address information and the data to be transferred as the data signal Data into the third terminal 203.

At this time, since the clock signal clk is input into the second terminal 202, the DFF 103 operates. Since the signal at the power supply VDD level (the High level) is input into the D terminal of the DFF 103, a signal at the High level (1) is output from the Q terminal The selector 104 selects the output signals of the SPI interface circuit 101 in response to the signal at the High level, and outputs (writes) the output signals to the register.

Since the signal fixed at the Low level is input into the clock terminal of the I2C interface circuit 102, the I2C start condition (i.e., when the clock signal clk is at High level, the data signal data changes to Low level) is not satisfied. Thus, an acknowledgement is not output from the I2C interface circuit 102 to the CPU.

As described above, since the terminal for inputting the clock signal clk into the clock terminal of the SPI interface circuit 101 is not shared with the terminal for inputting the clock signal clk into the clock terminal of the I2C interface circuit 102, erroneous recognition at the interface circuits can be eliminated. Further, since no dummy access is required for the protocol recognition, a complicated control is not required.

Further, since the protocol recognition and the output signal selection can be performed without providing additional terminals, an increase in chip size can be prevented. For example, in order to increase one terminal in a 4×4 terminal arrangement, a 4×5 or 5×5 terminal arrangement is required (since, typically, the terminal arrangement is preferably in a rectangular shape, or a square shape in consideration of the effect on area), and thus, addition of only one terminal leads to an increase in chip size. By configuring the communication interface device as described above, requirements regarding area occupation can be also addressed. This is particularly advantageous for implementation of a small package such as a wafer level chip size package (WCSP). The current WCSP requires a terminal to have a certain size or more in order to secure reliability when it is mounted on a substrate. Therefore, the smaller the chip size is, the smaller the number of mountable terminals is. The above-described configuration is particularly advantageous for such a micro integrated circuit manufactured to ensure that the terminals to have a certain size or more while reducing the package size.

Second Exemplary Embodiment

Figure 4:
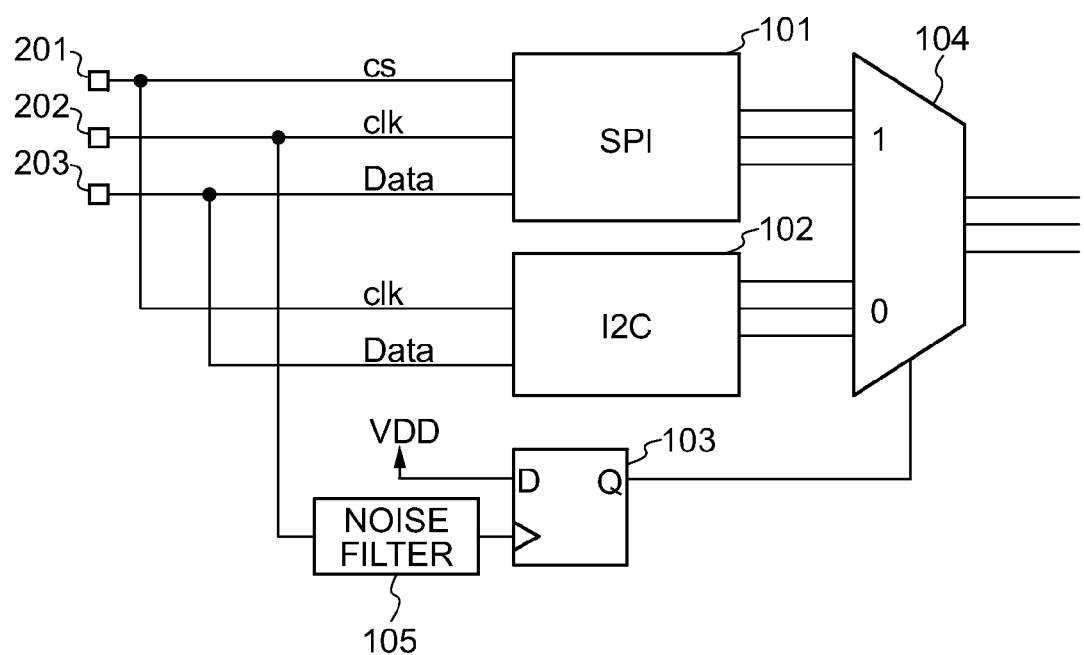
FIG. 4 is a circuit diagram of a communication interface device according to a second exemplary embodiment.

FIG. 4 is a circuit diagram of a communication interface device according to a second exemplary embodiment. The second exemplary embodiment is different from the first exemplary embodiment in that a noise filter 105 is added to the clock signal path (between the second terminal 202 and the clock terminal of the DFF 103) of the DFF 103.

As described in the first exemplary embodiment, the signal input to the second terminal 202 is fixed at VDD or GND level in order to perform I2C communication. Although the CPU inputs the fixed signal in this way, the signal level may vary due to an influence such as external noise. In the exemplary embodiment, the noise filter 105 is added to filter (remove) a disturbance noise mixed into the signal input from the second terminal 202, thereby preventing the DFF 103 from being affected.

In this manner, due to the noise filter 105 for filtering a disturbance noise is provided, an erroneous operation due to the disturbance noise can be prevented.

Third Exemplary Embodiment

Figure 5:
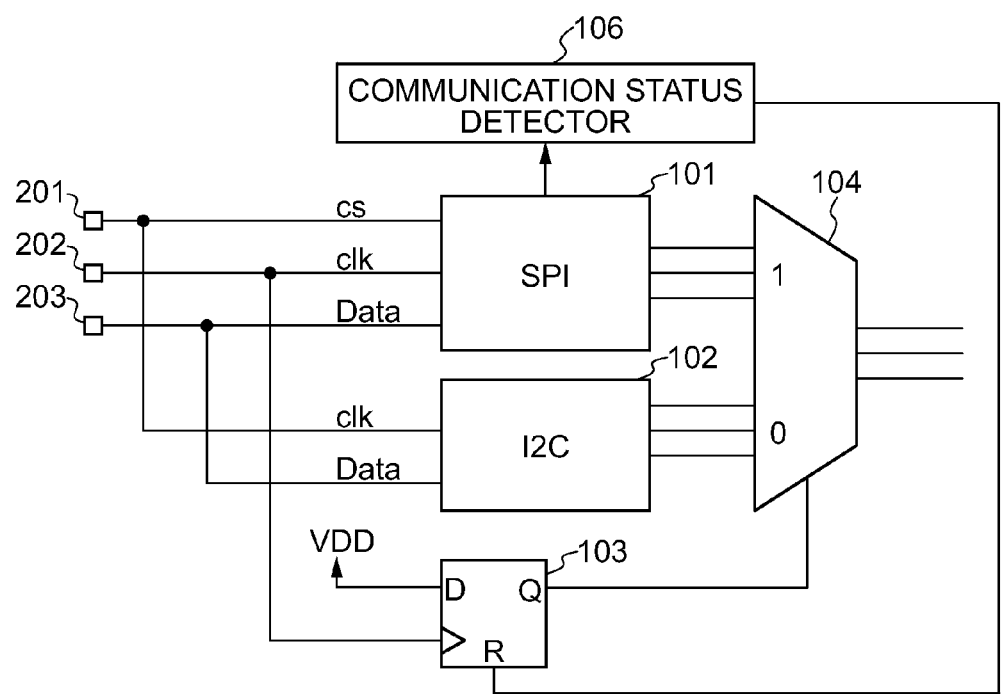
FIG. 5 is a circuit diagram of a communication interface device according to a third exemplary embodiment.

FIG. 5 shows a circuit diagram of a communication interface device according to a third exemplary embodiment. In the second exemplary embodiment, an example in which a disturbance noise is removed by the noise filter 105 and the Q terminal output is fixed at the Low level during the I2C communication. However, for the present exemplary embodiment, a configuration will be described in which a communication status detector 106 for detecting a communication status of the SPI interface circuit 101 is provided instead of the noise filter 105 and the Q terminal output is fixed at the Low level during the I2C communication despite of a disturbance noise.

The communication status detector 106 monitors, for example, a signal input into the chip select terminal of the SPI interface circuit 101 or a signal input into the clock terminal of the SPI interface circuit 101, and detects the communication status of the SPI interface circuit 101. More specifically, when the signal input into the chip select terminal of the SPI interface circuit 101 is fixed at the Low level, the detector 106 recognizes that the SPI interface circuit 101 is performing SPI communication, and when the signal periodically changes in its level, the detector 106 recognizes that the SPI interface circuit 101 is not performing SPI communication. Further, when the signal input into the clock terminal of the SPI interface circuit 101 periodically changes in its level, the detector 106 recognizes that the SPI interface circuit 101 is performing SPI communication, and when the signal is fixed at the Low level or the High level, the detector 106 recognizes that the SPI interface circuit 101 is not performing SPI communication.

The clear terminal of the DFF 103 is released (i.e., the reset signal at the High level is not input to the clear terminal of the DFF 103) while the SPI communication is being detected, and the reset signal is output to the clear terminal and the DFF 103 is set in the reset state while the SPI communication is not being detected. Thus, similar effects to those of the second exemplary embodiment can be obtained.

Alternately, the communication status detector 106 may be directly connected to the second terminal 202 in order to detect the communication status of the SPI interface circuit 101.

The communication status detector 106 is described as detecting the communication status of the SPI interface circuit 101; however, embodiments are not limited thereto, and the detector 106 may monitor the signal input into the clock terminal of the I2C interface circuit 102 to detect the communication status of the I2C interface circuit 102. In this case, the reset signal is output to the clear terminal and the DFF 103 is set in the reset state while the I2C communication is being detected, and the clear terminal of the DFF 103 is released (i.e., the reset signal at the High level is not input to the clear terminal of the DFF 103) while the I2C communication is not being detected. Alternately, the communication status detector 106 may be directly connected to the first terminal 201 in order to detect the communication status of the I2C interface circuit 102.

Further, the communication status detector 106 may be configured to detect both the communication status of the SPI interface circuit 101 and the communication status of the I2C interface circuit 102.

Fourth Exemplary Embodiment

Figure 6:
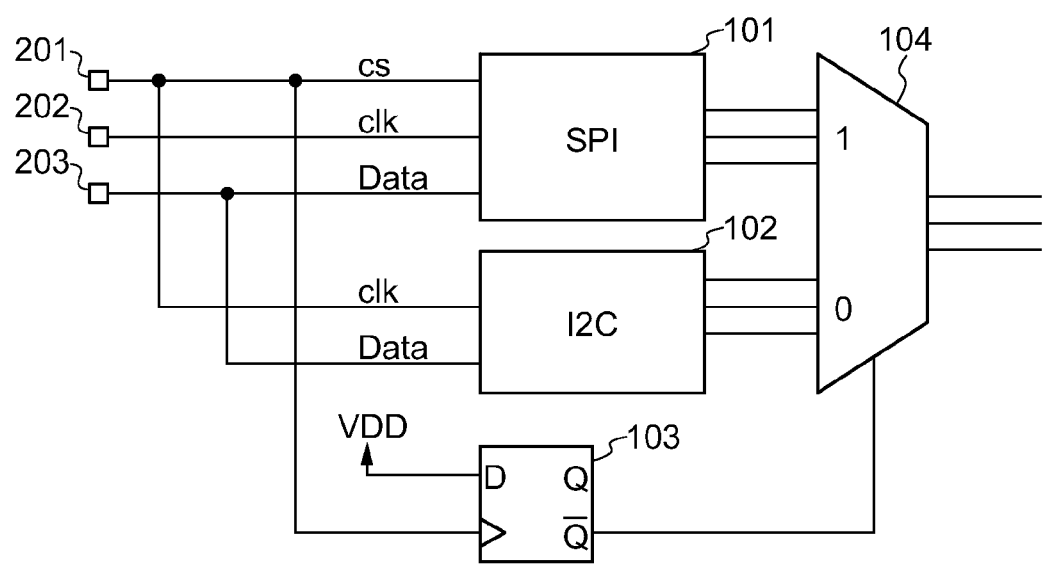
FIG. 6 is a circuit diagram of a communication interface device according to a fourth exemplary embodiment.
Figure 7:
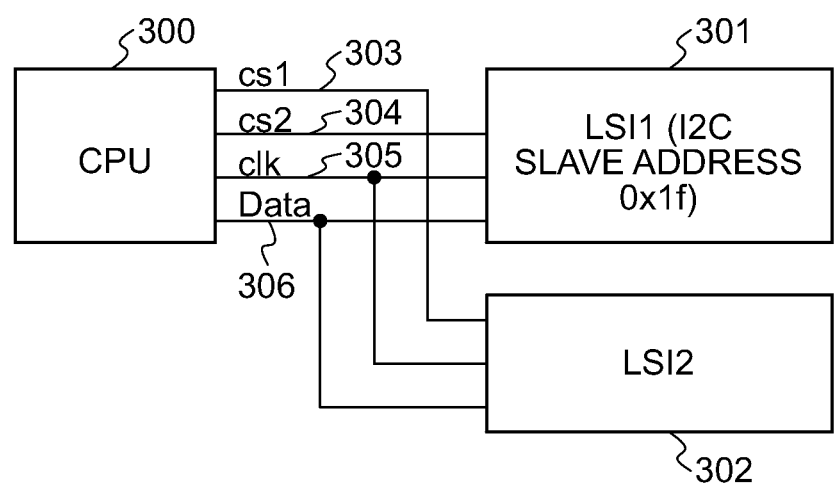
FIG. 7 is a diagram showing an exemplary configuration of a communication circuit when three-wire communication is made between a CPU and two LSIs in a conventional art.

FIG. 6 is a circuit diagram of a communication interface device according to a fourth exemplary embodiment.

A difference between the communication interface device according to the first exemplary embodiment and the communication interface device according to the present exemplary embodiment will be described herein. The clock terminal of the DFF 103 according to the present exemplary embodiment is connected to the first terminal 201 instead of the second terminal 202. The selector 104 is connected with the /Q terminal which is an invert output terminal of the DFF 103 instead of the Q terminal which is the non-invert output terminal of the DFF 103. Further, in the present exemplary embodiment, since the second terminal 202 is not connected to the DFF 103, signals input into the second terminal 202 during the I2C communication are not particularly limited.

Operations in a case in which a communication is performed in the two-wire I2C interface protocol in the present exemplary embodiment will be described.

The CPU inputs a clock signal clk into the first terminal 201 and inputs a data signal Data into the third terminal 203. Specifically, the CPU inputs signals for the I2C start condition into the first terminal 201 and the third terminal 203, and then inputs the clock signal into the first terminal 201 and inputs address information and data to be transferred into the third terminal 203.

At this time, since the clock signal clk input into the first terminal 201 is input into the clock terminal of the DFF 103, the DFF 103 operates. Since a signal at the power supply VDD level (High level) is input into the D terminal of the DFF 103, the signal at the Low level is output from the /Q terminal The selector 104 selects and outputs (writes) the output signal of the I2C interface circuit 102 to the register in response to the signal at the Low level.

Next, operations in a case in which a communication is performed in the three-wire SPI interface protocol will be described below.

The CPU inputs the reset signal into the clear terminal of the DFF 103 in advance to set the DFF 103 in the reset state, and inputs the chip selection signal cs fixed at the Low level into the first terminal 201. Further, the CPU inputs the clock signal clk into the second terminal 202, and inputs and transfers the address information and the data to be transferred as the data signal Data into the third terminal 203.

In the reset state in which the CPU inputs the reset signal into the clear terminal of the DFF 103 in advance, as long as a clock signal is not input into the clock terminal of the DFF 103, the output of the /Q terminal of the DFF 103 is fixed at the High level. As described above, since the signal of the first terminal 201 is fixed at the low level during the SPI communication, the DFF 103 does not operate. In other words, the output of the /Q terminal of the DFF 103 is kept fixed at the High level. Thus, the selector 104 selects and outputs (writes) the output signal of the SPI interface circuit 101 to the register.

Further, since the signal fixed at the Low level is input into the clock terminal of the I2C interface circuit 102, the I2C start condition (i.e., when the clock signal clk is at High, the data signal Data changes to Low) is not satisfied. Therefore, an acknowledgement is not output from the I2C interface circuit to the CPU.

Also with this configuration, similar effects to those of the first exemplary embodiment can be obtained.

The communication interface device shown in FIG. 6 may be provided with the noise filter 105 at the clock signal path (between the first terminal 201 and the clock terminal of the DFF 103) of the DFF 103 as in the second exemplary embodiment.

Further, the communication interface device shown in FIG. 6 may be provided with the communication status detector 106 as in the third exemplary embodiment. The communication status detector 106 causes the reset signal to be output to the clear terminal and set the DFF 103 in the reset state while a SPI communication is being detected, and causes the clear terminal of the DFF 103 to be released (prevents the reset signal at the high level from being input to the clear terminal of the DFF 103) while a SPI communication is not being detected. In a case in which the communication status detector 106 is configured to detect the communication status of the I2C interface circuit 102, the clear terminal of the DFF 103 is released (the reset signal at the high level is not input into the clear terminal of the DFF 103) while an I2C communication is being detected, and the reset signal is output to the clear terminal and the DFF 103 is sent in the reset state while an I2C communication is not being detected. Thus, similar effects to those of the third exemplary embodiment can be obtained.

The communication status detector 106 may also configured to detect both the communication status of the SPI interface circuit 101 and the communication status of the I2C interface circuit 102.

Other Exemplary Embodiments

Various configurations other than those described in the first to fourth exemplary embodiments can be applied in embodiments of the present invention. For example, the clear terminal of the DFF 103 is set to be active at High level (active-high) in the above-described exemplary embodiments; however, it may be set to be active at Low level (active-low). In this case, a reset signal at the Low level is input into the clear terminal for reset operation.

The first to fourth exemplary embodiments are described as examples in which when the signal input from the DFF 103 into the selector 104 is at the High level (1), the output signals of the SPI interface circuit 101 are selected, and when the signal is at the Low level (0), the output signals of the I2C interface circuit 102 are selected. However, embodiments are not limited thereto. A configuration may be made such that when the signal input from the DFF 103 into the selector 104 is at the High level (1), the output signals of the I2C interface circuit 102 are selected, and when the signal is at the Low level (0), the output signals of the SPI interface circuit 101 are selected, by adopting, for example, the following configuration.

In the first to third exemplary embodiments, the /Q terminal which is the invert output terminal of the DEF 103 is connected to the selector 104 instead of the Q terminal In the fourth exemplary embodiment, the Q terminal of the DEF 103 is connected to the selector 104 instead of the /Q terminal The selector 104 selects the signals output from the output terminals of the I2C interface circuit 102 when the signal output from the /Q terminal is at the High level (1), and selects the signals output from the output terminals of the SPI interface circuit 101 when the signal is at the Low level (0).

In the above exemplary embodiments, there has been described that the DFF 103 is not provided with a preset terminal for fixing the output of the Q terminal at the High level in response to an input of a reset signal (the reset signal is at the Low level in an active-low configuration, and is at the High level in an active-high configuration) or does not use the same even if the preset terminal is provided. However, for example, the DFF 103 may be configured to be provided with the preset terminal and the preset terminal is used for reset operation. In case of this configuration, a signal at the GND level (the Low level) is input into the D terminal of the DFF 103.

Further, in the first to third exemplary embodiments, the selector 104 may be configured to select the signals output from the output terminals of the I2C interface circuit 102 when the signal output from the Q terminal is at the High level (1), and selects the signals output from the output terminals of the SPI interface circuit 101 when the signal is at the Low level (0). Alternately, the selector 104 may be is connected to the /Q terminal and may be configured to select the signals output from the SPI interface circuit 101 when the signal input from the DFF 103 into the selector 104 is at the High level (1), and selects the signals output from the I2C interface circuit 102 when the signal is at the Low level (0).

In the fourth exemplary embodiment, when a configuration in which the preset terminal is used for reset operation that sets the D terminal at the GND level is adopted, the Q terminal of the DFF 103 is connected to the selector 104. The selector is configured to select the output signals of the SPI interface circuit 101 when the signal input from the DFF 103 into the selector 104 is at the High level (1), and selects the output signals of the I2C interface circuit 102 when the signal is at the Low level (0). Alternately, the selector 104 may be connected to the /Q terminal, and the selector may select the output signals of the I2C interface circuit 102 when the signal input from the DFF 103 into the selector 104 is at the High level (1) and may select the output signals of the SPI interface signal 101 when the signal is at the Low level (0). When the communication status detector 106 is provided, the reset signal is configured to be input from the communication status detector 106 into the preset terminal of the DFF 103.

The respective exemplary embodiments are described such that the three-wire interface protocol is the SPI and the two-wire interface protocol is the I2C. However, similar effects can be obtained even with other three-wire or two-wire interface protocol.

What is claimed is:

1. A communication interface device comprising:
    a first interface circuit comprising a chip select terminal connected to a first terminal, a clock terminal connected to a second terminal, and a data terminal connected to a third terminal; and
    a second interface circuit comprising a second clock terminal connected to the first terminal and a data terminal connected to the third terminal,
    wherein in a case of performing communication by the first interface circuit, a fixed signal fixed at a predetermined level is input into the first terminal, a clock signal is input into the second terminal, and a data signal is input into the third terminal, and
    in a case of performing communication by the second interface circuit, the clock signal is input into the first terminal and the data signal is input into the third terminal.

2. The communication interface device of claim 1, further comprising a selecting unit,
    wherein in a case of performing communication by the second interface circuit, a fixed signal fixed at a predetermined level is input into the second terminal, and
    the selecting unit selects signals output from the second interface circuit in a case in which the signal input into the second terminal is the fixed signal, and selects signals output from the first interface circuit in a case in which the signal input into the second terminal is the clock signal.

3. The communication interface device of claim 2, wherein the selecting unit comprises:
    a selector into which a selection signal for selecting either the signals output from the first interface circuit or the signals output from the second interface circuit is input, the selector selecting the signals output from the first interface circuit in a case in which the input selection signal is at a first level, and selecting the signals output from the second interface circuit in a case in which the input selection signal is at a second level; and
    a D flip-flop having a third clock terminal connected to the second terminal, and an output terminal that outputs the selection signal at the first level to the selector in a case in which a signal input into the third clock terminal is the clock signal, and outputs the selection signal at the second level to the selector in a case in which the signal input into the third clock terminal is the fixed signal.

4. The communication interface device of claim 3, further comprising a noise filter that removes disturbance noise, the noise filter being disposed between the third clock terminal of the D flip-flop and the second terminal.

5. The communication interface device of claim 3, further comprising a detection controlling unit, wherein the D flip-flop is configured such that the selection signal at the second level is input from the output terminal of the D flip-flop into the selector in a reset state thereof, and the detection controlling unit detects a communication status of at least one of the first interface circuit or the second interface circuit, and controls such that while communication is not being detected in the first interface circuit or communication is being detected in the second interface circuit, the D flip-flop is in the reset state.

6. The communication interface device of claim 1, further comprising a selecting unit that selects the signals output from the second interface circuit in a case in which a signal input into the first terminal is the clock signal, and selects the signals output from the first interface circuit in a case in which the signal input into the first terminal is the fixed signal.

7. The communication interface device of claim 6, wherein the selecting unit comprises:

a selector into which a selection signal for selecting either the signals output from the first interface circuit or the signals output from the second interface circuit is input, the selector selecting the signals output from the first interface circuit in a case in which the input selection signal is at a first level, and selecting the signals output from the second interface circuit in a case in which the input selection signal is at a second level; and a D flip-flop having a third clock terminal connected to the first terminal, and an output terminal that outputs the selection signal at the first level to the selector in a case in which a signal input into the third clock terminal is the fixed signal, and outputs the selection signal at the second level to the selector in a case in which the signal input into the third clock terminal is the clock signal.

8. The communication interface device of claim 7, further comprising a noise filter that removes disturbance noise, the noise filter being disposed between the third clock terminal of the D flip-flop and the first terminal.

9. The communication interface device of claim 7, further comprising a detection controlling unit, wherein the D flip-flop is configured such that the selection signal at the first level is input from the output terminal of the D flip-flop into the selector in a reset state thereof, and the detection controlling unit detects a communication status of at least one of the first interface circuit and the second interface circuit, and controls such that while communication is being detected in the first interface circuit or communication is not being detected in the second interface circuit, the D flip-flop is in the reset state.

10. A communication method of a communication interface device comprising a first interface circuit having a chip select terminal connected to a first terminal, a clock terminal connected to a second terminal, and a data terminal connected to a third terminal, and a second interface circuit having a second clock terminal connected to the first terminal and a data terminal connected to the third terminal, the method comprising:

in a case of performing communication by the first interface circuit, inputting a fixed signal fixed at a predetermined level into the first terminal, inputting a clock signal into the second terminal, and inputting a data signal into the third terminal; and in a case of performing communication by the second interface circuit, inputting the clock signal into the first terminal and inputting the data signal into the third terminal.

\* \* \* \* \*